United States Patent [19]

Matheny

[11] Patent Number: 4,862,494
[45] Date of Patent: Aug. 29, 1989

[54] ANTI-FRAUD DEVICE FOR USE WITH A COIN OPERATED TELEPHONE INSTRUMENT

[76] Inventor: Mark Matheny, 159 Deer Run Trail, Manchester, Conn. 06040

[21] Appl. No.: 274,830

[22] Filed: Nov. 22, 1988

[51] Int. Cl.⁴ .......................................... H04M 17/02
[52] U.S. Cl. .................................... 379/145; 379/132; 379/155
[58] Field of Search ............... 379/145, 146, 155, 154, 379/147, 143, 132, 150

[56] References Cited

U.S. PATENT DOCUMENTS

| | | | |
|---|---|---|---|
| 2,958,732 | 11/1960 | Maguire | 379/143 |
| 3,668,290 | 6/1972 | Robertson, Jr. | 379/155 |
| 3,676,597 | 7/1972 | Peterson | 379/145 |
| 4,039,768 | 8/1977 | O'Maley | 379/154 |
| 4,086,439 | 4/1978 | Vowles et al. | 379/145 |
| 4,638,121 | 1/1987 | Clark, Jr. | 379/145 |
| 4,794,642 | 12/1988 | Arbabzadah et al. | 379/200 |

FOREIGN PATENT DOCUMENTS 0170267  10/1983  Japan ................................. 379/145

Primary Examiner—Robert Lev
Attorney, Agent, or Firm—McCormick, Paulding & Huber

[57] ABSTRACT

An anti-fraud device is mounted internally within a coin-operated telephone to prevent fraudulent calling due to "pin fraud". The device includes circuitry which senses the presence of ground fraud conditions to disconnect the transmitting element from the telephone to prevent the defeat of a coin collect supervisory signal to cause coins temporarily held in the coin hopper to drop into the coin collection box rather than to be returned to the user.

2 Claims, 3 Drawing Sheets

ANTI-FRAUD DEVICE FOR USE WITH A COIN OPERATED TELEPHONE INSTRUMENT

BACKGROUND OF THE INVENTION

The present invention relates generally to coin operated telephones and deals more specifically with apparatus for preventing fraudulent calling initiated with a "tip-to-ground" fraud condition to defeat detection of a coin collector supervisory signal at the telephone instrument.

Coin operated telephone instruments are well known and understood in the art and the problem of fraudulent calling due to the generation of coin deposit audio signals to simulate coin deposit into the telephone instrument is also well recognized. Accordingly, there are numerous devices and proposed solutions for preventing acoustically oriented fraudulent calling and include, in some instances, complex circuit arrangements in the telephone instrument and in the various telephone offices serving the telephone instrument. However, none of the known prior devices recognize or prevent fraudulent calling due to "tip-to-ground" fraud conditions which is commonly referred to the telephone industry as "pin fraud". It is estimated that revenues lost in the United States alone due to "pin fraud" may approach millions of dollars annually.

"Pin fraud" describes a type of fraudulent calling where a pin or other small metallic object is inserted into the transducer or transmitter element in the mouthpiece of the handset and which pin is used as a contact to electrically short circuit the telephone subscriber line to ground potential to prevent the coin collect supervisory electrical signal from operating the coin collect circuitry within the telephone instrument, thereby, causing coins temporarily held in a coin hopper to be returned to the telephone user rather than the coin collection box within the telephone instrument. It is also possible to commit "pin fraud" by inserting the pin into the transducer or receiving element in the earpiece of the handset to provide the contact for short circuiting the telephone line to ground potential. Although the transmitter and receiver elements are generally used as the access points for initiating a "tip-to-ground" fraud condition, the fraud condition may also be introduced through the cord connecting the handset to the telephone instrument.

Therefore, it is an object of the present invention to provide an anti-fraud device for use with a coin operated telephone instrument which prevents fraudulent calling due to "pin fraud".

It is a further object of the present invention to provide apparatus for preventing fraudulent calling due to "tip-to-ground" fraud conditions which prevent the collection of deposited coins.

It is a yet further object of the present invention to provide an anti-fraud device which is located internally in the telephone instrument housing and without the requirement of additional special circuitry in the telephone office serving the telephone instrument.

SUMMARY OF THE INVENTION

In accordance with the present invention, an anti-fraud device for use with a coin operated telephone instrument to prevent fraudulent calling due to "pin fraud" is presented. The device is connected to the transmission network located in the telephone instrument in which the network connects the telephone instrument to the telephone subscriber line to send and receive electrical signals representative of audio and call supervision to and from the telephone line. The transmitter element of the telephone instrument is arranged in series with contacts of a dual coil, dual contact latching relay to electrically connect and disconnect the transmitter element to and from the transmission network and accordingly, the telephone subscriber line. An "ON-HOOK/OFF-HOOK" sensor detects the presence of an "OFF-HOOK "condition at the telephone instrument and activates a timer which produces voltage signals at pre-determined timed intervals in response to the sensing of an "OFF-HOOK" condition. A ground sensing circuit is connected to the transmitter element through a contact of the relay and provides a voltage signal representative of a ground fault condition in response to the presence of an electrical ground potential at the transmitter element. The touch-tone dial keypad of the telephone instrument is coupled to the anti-fraud device and activations associated with the keypad are sensed and are inputted to a counting circuit which counts the number keypad activations after the sensing of an "OFF-HOOK" condition. The counter produces an output voltage pulse after counting a pre-determined number of activations and which output voltage is used to reset the relay to disconnect the transmitter element from the telephone transmission network and the telephone subscriber line. After the pre-determined number of keypad activations are counted the transmitter element is disconnected until such time as the anti-fraud device is reset when the telephone instrument is returned to an "ON-HOOK" condition. This feature prevents defeat of the anti-fraud device through repeated keypad activations which would otherwise deplete the energy stored in a capacitor of the power supply which is used to power the electric components of the circuit. A second counting circuit is coupled to a ground sensing circuit and counts the number of occurrences of the presence of an electrical ground potential at a terminal of the telephone transmission network. There are occasional ground conditions present at the network during the course of a telephone connection due to the operation of a telephone switching network. The counter is arranged to count a predetermined number of ground occurrences during a pre-determined time interval set by a timing pulse generator. The ground occurrence counter is reset to a zero count at the beginning of each reset interval to accommodate the occassional normally expected ground occurrences. Upon counting the pre-determined number of ground occurrences during the pre-determined interval, an output signal from the counter is used to cause the operation of the relay to reset it to disconnect the transmitter element from the telephone transmission network and the subscriber line. Consequently, the presence of a ground fraud condition at the transmitter element causes the relay to reset to disconnect the transmitter element which permits the coin collector supervisory signal sent from the telephone office serving the telephone instrument to activate the coin collect relay within the telephone instrument in the presence of a ground at the transmitter element which causes the deposited coins to be transferred to the coin collection box within the telephone instrument.

The invention further includes isolation means for electrically coupling the receiving element of the handset to the telephone instrument transmission network whereby a "tip-to-ground" fraud condition is prevented from being introduced at the receiving element and the telephone cord coupling the handset to the telephone instrument.

BRIEF DESCRIPTION OF THE DRAWINGS

Additional features and advantages of the present invention will become readily apparent from the following description and the drawings wherein.

DETAILED DESCRIPTION OF PREFERRED EMBODIMENTS

Figure 1:
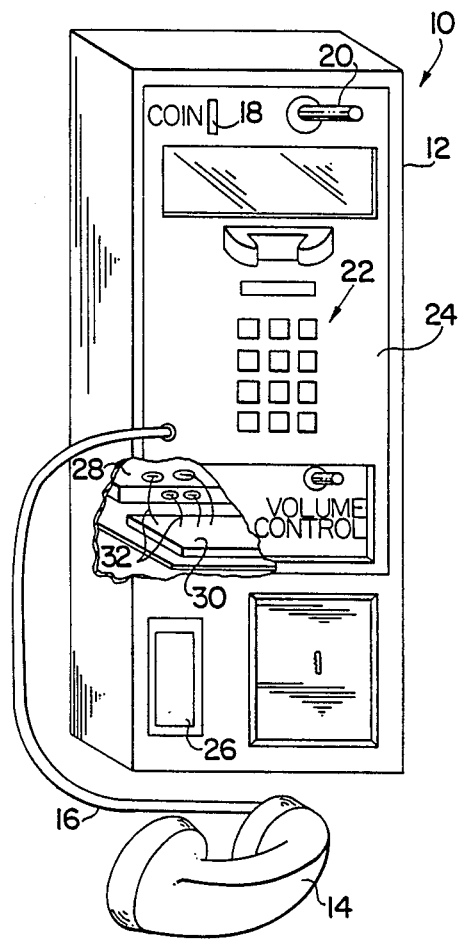
FIG. 1 is a perspective view of a coin operated telephone instrument with which the anti-fraud device of the present invention may be used. The telephone housing is shown partially cut away to reveal a circuit board containing the electronic components comprising the anti-fraud device.

Referring to the drawings and considering FIG. 1 in particular, a coin operated telephone instrument of the general type with which the anti-fraud device of the present invention may be used is shown therein and designated 10. The telephone 10 includes a housing 12 generally of metal construction, a conventional handset 14 connected to the telephone instrument and a transmission and balancing network within the telephone instrument by a cord 16. The transmission network may be one of a number of different types and is generally well understood by those who are skilled in the telephone transmission part. The telephone 10 further includes a coin slot 18, a coin release 20, a touch-dialing keypad shown generally at 22 and located on the face 24 of the telephone instrument 10 and a coin return chute 26 also located on the face of the telephone instrument. A portion of the telephone housing 12 is cut away to reveal a terminal connection block 28 which is used as a connection point for the various components comprising the telephone instrument. A circuit board or module 30 containing the electrical components comprising the anti-fraud device of the present invention is connected to the terminal block 28 by leads 32, 32.

The telephone instrument 10 is also connected to the telephone subscriber line in a conventional manner to send and receive electrical signals representative of audio, speech and call supervision. The audio or speech is generally converted by a carbon microphone or a transmitting element in the mouthpiece of the handset to electrical signals which are coupled to the telephone subscriber line. Received electrical signals are converted into audio by a transducer generally located in the earpiece of the handset. The operation of the transmitting element and receiving transducer are generally well known in the art and a further understanding of their operation is not essential to the disclosure of the anti-fraud device of the present invention.

Figure 2:
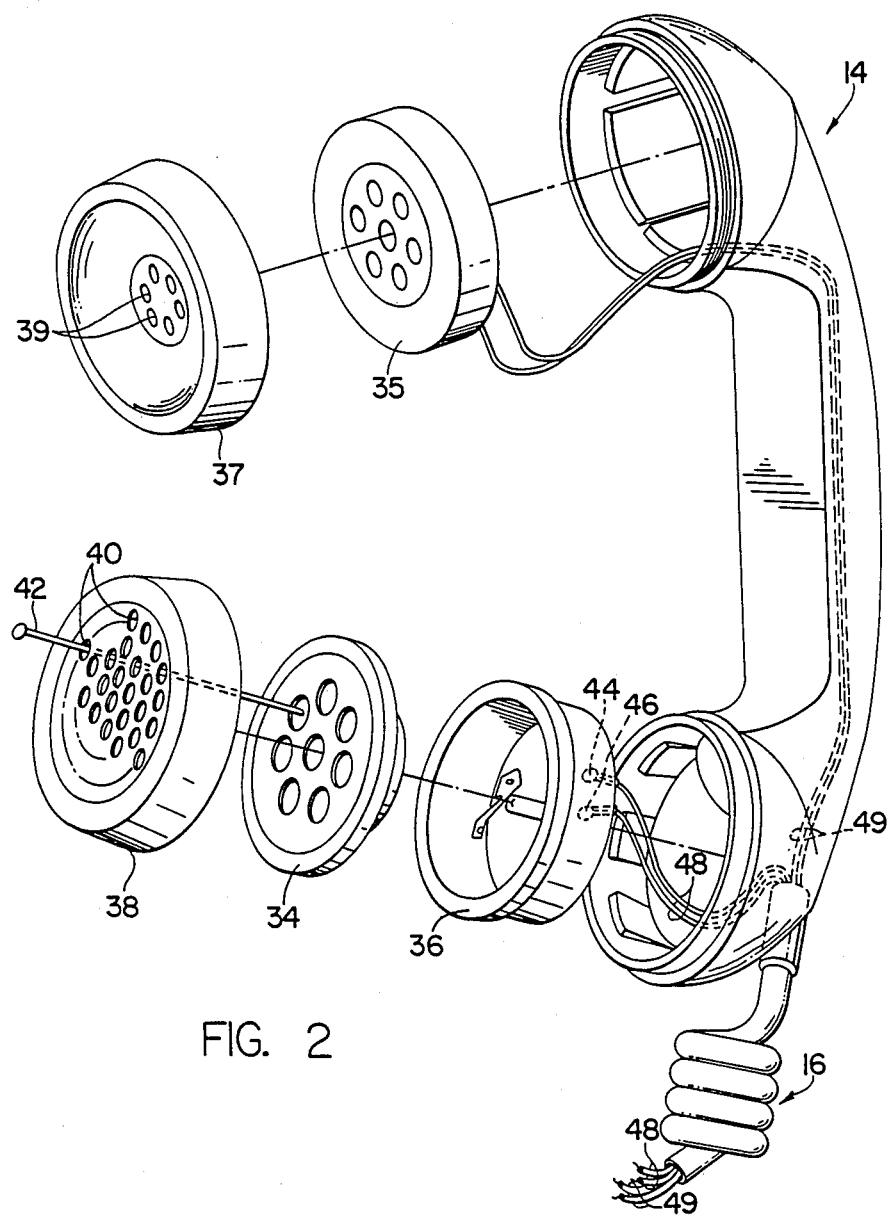
FIG. 2 is an exploded view of a typical handset used with the telephone instrument showing a pin inserted through the mouthpiece cover into the transmitter element. The pin is connected to a ground reference voltage potential to defeat telephone coin collection circuits and permit fraudulent calling.

Referring now to FIG. 2 an exploded view of a typical handset 14 is shown therein illustrating the carbon microphone or transmitting element 34, a receiving cup 36 having contacts 44 and 46 for making electrical connection with the transmitting element 34 in a well known manner. The transmitting element 34 and receiving cup 36 are held within the handset by the mouthpiece cover 38. The mouthpiece cover 38 includes a number of openings 40, 40 which permit the acoustic excitation of the transmitting element 34. The handset 14 is also shown having a receiving element 35 which is held within the handset by an earpiece cover 37. The earpiece cover 37 includes a number of openings 39, 39 which permit acoustic signals produced by the receiving element to be transmitted to the telephone user.

As illustrated in FIG. 2, a fraudulent grounding condition is introduced via a pin or similar metallic object 42 inserted through one of the openings 40 in the mouthpiece cover 38 and into contact with the transducer element 34. The telephone user then has access via an external grounding lead attached to the pin 42 to introduce an electrical ground potential at an appropriate time during the telephone call to defeat the coin collection supervisory signal which is applied in a manner known to those skilled in the art to the coin collection circuitry within the telephone instrument. As shown in the figure, the transmit element 34 is electrically connected to the telephone instrument via the cord 16 which includes a pair of wires 48 which terminate at the contacts 44, 46.

The fraudulent grounding condition may also be introduced via a pin inserted through one of the openings 39 in the earpiece cover 37 and into contact with the receiving element 35 which is electrically connected to the telephone instrument transmission network via a pair of wires 49 in the cord 16. Alternately, the cord 16 may be pierced to introduce the fraudulent grounding condition.

Figure 3:
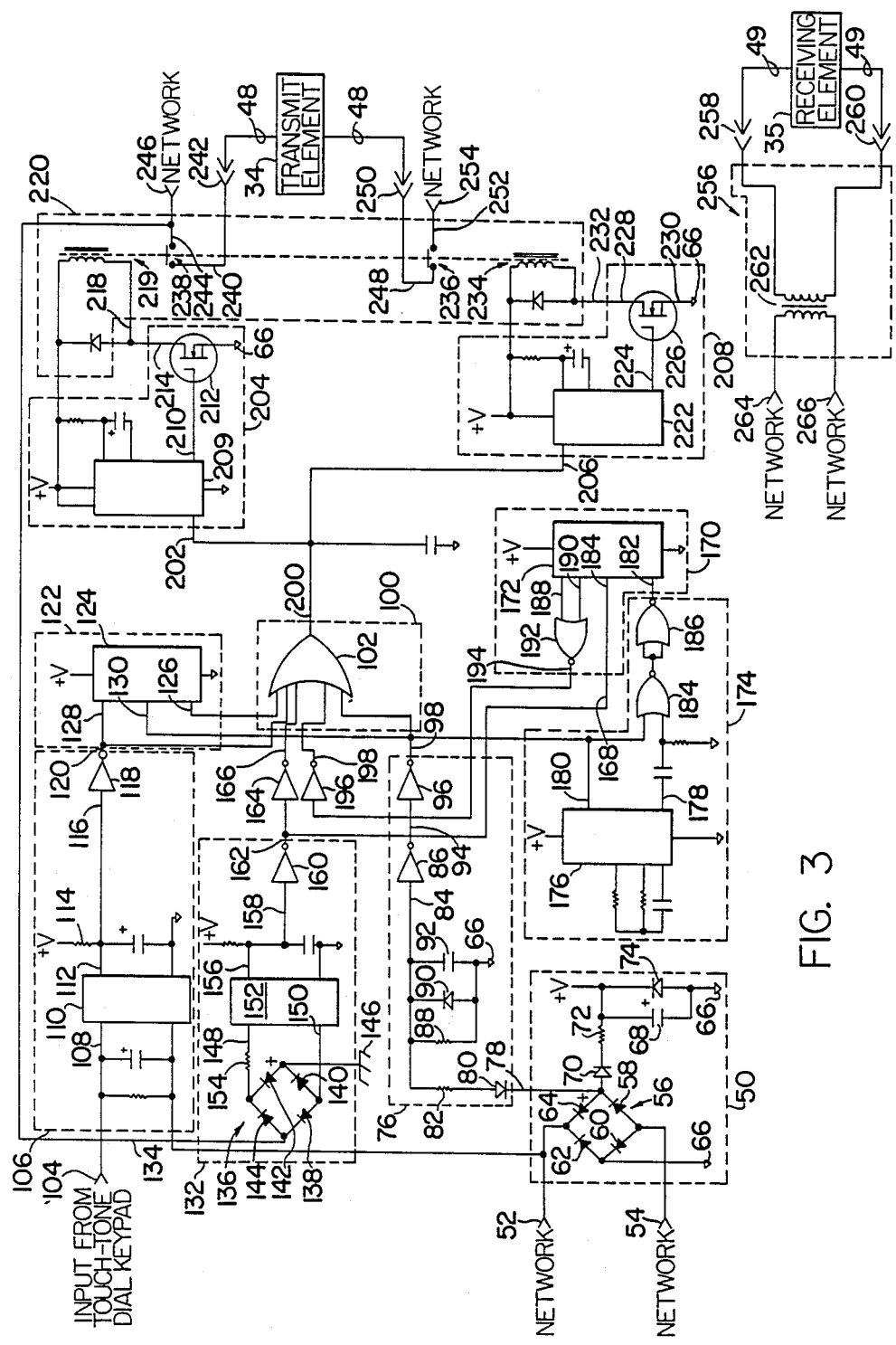
FIG. 3 is an electrical circuit schematic diagram illustrating one embodiment of the anti-fraud device of the present invention.

Turning now to FIG. 3, an electrical circuit schematic diagram showing the major electrical components comprising one embodiment of the anti-fraud device of the present invention is shown therein. It will be understood that the specific circuit designs may vary as a direct result of the designer's choice of electrical components and type. Preferably, the anti-fraud device of the present invention is implemented using electrical components having a low power consumption requirement such as, for example, devices designed and fabricated using CMOS technology to minimize power consumption and current drawn from the telephone subscriber line.

The anti-fraud device of FIG. 3 is coupled to the tip and ring of a telephone subscriber line through the telephone instrument's transmission network input leads 52, 54 which also couple a power supply of the device represented by the dashed line box 50. When the telephone instrument is in an "ON-HOOK" condition, current is provided through the input leads 52, 54 which are connected to a standard diode bridge 56. The bridge 56 comprises diodes 58, 60, 62 and 64 arranged in a full wave bridge configuration. Lead 52 is connected to the junction formed by the cathodes of diodes 62 and 64 and lead 54 is connected to the junction formed by the anodes of diodes 58 and 60. The junction formed by the anode of diode 62 and the cathode of diode 60 is connected to a common reference or ground potential designated 66. A capacitor 68 is charged primarily during the time that the telephone instrument is "ON-HOOK" due to current flowing, for example, through lead 52, diode 64, diode 70 and the series resistor 72 through the capacitor 68 to the ground reference potential continuing through the diode 60 and finally to the other side of the telephone line at terminal 54. During instances of battery reversals, such as, for example when going "ON-HOOK" and during supervisory signalling, the bridge 56 again charges the capacitor 68 to the voltage potential developed across the bridge between the points defined by the junction of the cathode of diode 60 and anode of 62 and the junction defined by the cathode of diode 58 and the anode of the diode 64. When the telephone instrument is in an "OFF-HOOK" condition, a very low impedance appears across terminals 52 and 54 which effectively places a negative voltage potential at the inputs to the bridge circuit 56. Diode 70 blocks the current flow and accordingly, stops charging the capacitor 68. The capacitor 68 now discharges through zener diode 74 and a voltage designated "+VOLTAGE" is developed at the junction of the cathode of zener diode 74, one end of capacitor 68 and one end of resistor 72. The "+VOLTAGE" is used to power the electronic components of the apparatus of the present invention.

An "ON-HOOK" - "OFF-HOOK" sensing circuit designated by the dashed line box 76 has an input 78 connected to the junction of the cathode of diode 58 and the anode of diode 64 of the bridge 56 and an "OFF-HOOK" condition presents a negative voltage potential which forward biases zener diode 80, the diode 80 having its anode connected to the series resistor 82 between it and the input 84 of a Schmitt trigger circuit 86. A resistor 88, zener diode 90 and the capacitor 92 shunt the input 84 to ground reference potential 66 to dissipate spike voltage transients and filter any noise which may be present at the input 84. The output 94 of the inverter 86 is fed to the input of a second inverter 96 whose output 98 is fed to an OR logic circuit designated by the dashed line box 100. The output 98 forms one input to an OR logic gate 102 within the logic circuit 100. In the "ON-HOOK" condition, the output 98 is at a logical high voltage level and when the telephone instrument is in an "OFF-HOOK" condition the output 98 is at a logic low voltage level.

The touch-tone dial keypad is coupled to the anti-fraud device via terminal 104 and it serves as the input to a sensing circuit indicated by the dashed line box 106 which circuit senses each activation of a button on the touch-tone dial keypad. Signals from the keypad appearing at the terminal 104 are coupled to an input 108 of an opto-isolator 110. A signal appearing at the input 108 causes the opto-isolator 110 to produce a voltage signal at its output 112 causing the voltage level at the output 112 to drop from the "+VOLTAGE" potential present at one end of the resistor 114 and which is coupled to the output 112 to the ground reference potential during the activation of the keypad. This voltage signal transition is coupled to the input 116 of an inverter 118, configured as a Schmitt trigger, which causes its output 120 to change state from a ground reference potential to a logical high voltage potential. The output 120 serves as the input to a counting circuit designated by the dashed line box 122 and forms an input to the logic OR gate 102.

The counting circuit 122 includes a binary ripple counter 124 which is configured to produce a logical high voltage signal at its output 126 upon achieving a predetermined count of button activations at the touch-tone dial keypad. The output 126 of the counter 124 forms another input to the logic OR gate 102. The counter 124 also includes a reset input 130 which resets the counter to zero upon a change in state of the telephone instrument from an "OFF-HOOK" condition to an "ON-HOOK" condition. The purpose of the counter is to prevent the telephone user from depleting the power supply voltage capacity provided by the charge on the capacitor 68 as explained above, and thus defeating the anti-fraud device through removal of power.

The anti-fraud device also includes a ground sensing circuit designated generally within the dashed line box 132 and has an input 134. The ground sensing circuit 132 includes a full wave bridge 136 comprising diodes 138, 140, 142 and 144 configured in a full wave bridge arrangement. The input 134 is connected to the junction formed by the anode of diode 134 and the cathode of diode 138. The opposite side of the bridge formed by the junction of the anode of diode 142 and the cathode of diode 140 is connected to the electrical chassis ground potential indicated by the symbol 146. The bridge 136 is further coupled to the input terminals 148, 150 of an opto-isolator circuit 152 with the input 148 being connected through a resistor 154 to the junction formed by the cathodes of diodes 142 and 144. The input 150 is connected to the junction formed by the anodes of diodes 138 and 140. When a voltage signal is present at the input 134, the bridge 136 provides a path through diode 144, through the resistor 154 to the input 148 thereby forward biasing the light emitting diode of the opto-coupler by completing the circuit path through the input 150, through the forward biased diode 140 to the chassis ground 146. The presence of a voltage at the input 134 causes the output 156 of the opto-isolator 152 to be at a ground reference potential. The output 156 of the opto-isolator 152 is connected to the input 158 of an inverter 160 configured as a Schmitt trigger. The output 162 of the inverter 160 is at a logical high voltage potential when a voltage is present on the input 134 of the ground sensing circuit 132. The output 162 is coupled to the input of an inverter 164 configured as a Schmitt trigger and its output 166 forms another input to the OR logic gate 102 and is at a ground reference voltage potential when a voltage signal is present on the input 134.

The output 162 of the inverter 160 is also coupled to the input 168 of a ground occurrence counting circuit designated by the dashed line box 170. The ground occurrence circuit 170 includes a binary ripple counter 172 arranged to count a pre-determined number of ground occurrences present at its input during a pre-determined time interval and which time interval is generated by a timing pulse generator circuit within the dashed line box designated 174.

The pulse generator includes a binary ripple counter 176 arranged to count at a frequency such that a voltage transition occurs at its output 178 at a timed interval of 1.5 minutes which begins with the change from an "ON-HOOK" to an "OFF-HOOK" condition. A logical high voltage signal present at the reset 180 of the binary counter 176 inhibits the counter from counting and which high logic voltage potential is representative of an "ON-HOOK" condition of the telephone instrument. It will be noted that the reset input 180 is connected to the output 98 of the "ON-HOOK" - "OFF-HOOK" sensing circuit 76. Upon detection of an "OFF-HOOK" signal, the voltage potential at the output 98 becomes a logical low voltage or ground potential to enable the counter 176. The transitions present at the output 178 are in the form of leading and trailing edges of a 1.5 minute pulse which is coupled to the reset 182 of the binary ripple counter 172 comprising the ground occurrence counter circuit 170. The counter 172 resets upon the occurrence of a positive going transition to zero the count in the counter. It is readily seen that upon the occurrence of an "OFF-HOOK" condition the counter 172 is reset after the first 1.5 minutes and then reset every 3 minutes after that point as long as the telephone instrument remains in an "OFF-HOOK" condition.

The counter 172 is also reset at the beginning of a telephone call, that is, upon the occurrence of an "ON-HOOK" to an "OFF-HOOK" condition, this signal being present at the output 98 and coupled through the logic OR gates 184 and 186 of the timing pulse circuit 174. The output of the OR gate 186 is coupled to the reset 182 of the counter 172 as mentioned above. It can be seen then that the counter 172 will accumulate the number of ground occurrences sensed by the ground sensing circuit 132 which are present at its input 134 and which are coupled to the input 168 of the ground occurrence counting circuit 170. The counter 172 produces a voltage signal at its output 188 and 190, the first output occurring on lead 188 after a count of eight (8) and a second output occurring on lead 190 after an additional count of eight (8) with both outputs being coupled to an OR logic gate 192. The output 194 of the logic OR gate 192 is coupled to the input of an inverter 196 which is configured as a Schmitt trigger and the output 198 of the inverter 196 forms another input to the OR logic circuit 102.

On the sensing of a ground potential condition on the input lead 134 of the ground sensing circuit 132, the voltage potential sensed by the bridge 136 and inputted to the opto-isolator 152 across the input terminals 148 and 150 drops to zero causing the opto-isolator output to 156 to a logic high voltage potential. The output 162 of inverter 160 accordingly drops to a logic low voltage potential and is inputted to the ground occurrence counter 170 on the input lead 168 causing the counter 172 to increase its count by one. The sensing of the ground condition at the input 134 also causes a logic high voltage signal to appear at the output 166 of the inverter 164 which is coupled to one input of the OR logic gate 102.

The output 200 of the OR logic gate 102 is coupled to the input 202 of a first relay driver circuit within the dashed line box designated 204 and to the input 206 of a second relay driver circuit within the dashed line box designated 208. The relay driver circuit 204 includes a monostable multivibrator configured as a "single shot" circuit and produces a pulse voltage signal at its output 210 upon the occurrence of a negative transition trigger signal at the input 202. The output 210 of the multivibrator is coupled to FET 212 causing the FET to become conductive and switch its drain terminal 214 to a ground reference potential 66 which is connected to its source terminal 216. The drain terminal 214 serves as the output of the relay driver circuit 204 and is coupled to one end 218 of a coil 219 in a dual coil, double contact relay circuit contained within the dashed line box 220. The relay driving circuit 208 operates in a similar manner to the operation of the relay driving circuit 204 and includes a monostable multivibrator circuit 222 configured as a "single shot" circuit which produces a voltage pulse at its output 224 upon the occurrence of a positive transition trigger voltage signal appearing at the input 206. The output 224 is connected to a FET 226. The FET 226 has a drain terminal 228 which serves as the output of the relay driver circuit 208 and upon the presence of a voltage pulse at the output 224 of the monostable 222 causes the FET 226 to become conductive switching the drain terminal 228 to the ground reference potential 66 connected to the FET source terminal 230. The output of the relay circuit 208 is connected to an input 232 of the relay driver circuit 220, the input being connected to one end of a second coil 234 comprising the double coil, double contact relay.

The double coil, double contact relay is designed for latching applications and requires that the coils 219, 234 be briefly energized to change the state of the relay. The relay further includes transfer contacts 236 and 238. One end 240 of the contact 238 is connected to terminal 242 which in turn receives or is connected to one end of the transmitting element 34. The other end 244 of the contact 238 is connected to the telephone transmission network via terminal 246 and to the input 134 of the ground sensing circuit 132. One end 248 of the relay contact 236 is connected to terminal 250 which receives or is connected to the opposite side of the transmitting element 34. The opposite end 252 of the relay contact 236 is connected to a terminal 254 which is coupled to the telephone transmission network.

In a typical telephone instrument not having the anti-fraud device of the present invention, the transmitting element 34 would be connected to points on the telephone transmission network designated as terminals 246 and 254 in FIG. 3 via the wire pair 48. The anti-fraud device of the present invention takes advantage of the fact that in normal telephone instrument operation, a voltage potential is always present at the terminal 246 of the telephone transmission network. As can be seen, any attempt to ground the transmitting element 34 to deceive the coin collection circuitry in the office serving the telephone instrument must necessarily cause this voltage to become substantially zero with respect to chassis ground. As explained above, this would cause a ground potential to appear at the input 134 of the ground sensing circuit 132 which in turn produces a voltage signal at the output 200 of the logic OR gate 102 which is used to trigger the relay driving circuits 204 and 208.

In normal operation and without the presence of a ground fraud condition, the relay 200 is in a set condition, that is, the transfer contacts 236 and 238 initially are closed to provide electrical continuity between their respective ends to couple the transmit element 34 to the telephone transmission network. When a ground fault condition is applied to the transmitting element 34, as explained above, it is seen that the terminal 246 is also grounded removing the normally present voltage potential and accordingly presenting a ground fault condition at the input 134 of the ground sensing circuit 132. The presence of a ground fault condition causes the output 200 of the OR logic circuit 102 to change from a low voltage logic level to a high voltage logic level. This low-to-high transition is presented at the input 206 of the relay driving circuit 208 and causes the monostable multivibrator 222 to produce a voltage pulse at its output 224, as explained above, to provide a connection for the one end of the relay coil 234 through the FET 226 thereby energizing the relay coil and causing the relay to operate to a reset condition thereby opening the continuity across the transfer contacts 236 and 238, respectively. Upon operation of the relay 220, the ground fault condition introduced at the transmitting element 34 is removed from the input 134 of the ground sensing circuit 132 causing the output 200 of the OR logic gate 102 to change to a low voltage logic level. This change from a high to a low voltage logic level is present at the input 202 of the relay driver circuit 204 and causes the monostable multivibrator 209 to produce a voltage pulse at the output 210 causing the FET 212 to provide a conductive path to ground 66 for the coil 219 of the dual coil, dual contact relay to operate the relay to a set condition. In the set condition, the relay transfer contacts 236 and 238 respectively again provide continuity between the transmitting element 34 and the network terminals 246 and 254. If the ground fault condition is still present, the cycle is again repeated causing the ground fault counting circuit 170 to increment by one until such time as the number of ground occurrences counted reaches a pre-determined number, in this case eight. At the count of eight, the output of the ground occurrence counter causes the output 200 of the OR logics gate 102 to remain at a logic high voltage level for a pre-determined time to maintain the relay in its reset condition. Likewise, the coin collect supervisory signal is transmitted and since the ground fault condition initiated by the telephone user through grounding of the transmitting element 34 has been removed through the operation of the anti-fraud device, the coins temporarily stored in the coin hopper are transferred to the coin collection box in the telephone instrument thereby preventing the fraudulent calling.

It can also be seen that the output 126 of the touch-tone keypad counter 122 will cause the output 200 of the OR logic gate 102 to remain at a high voltage logic potential, and again, as explained above, causing the disconnection of the call forcing the telephone user to return to an "ON-HOOK" condition and to reinitiate the call sequence.

In a typical telephone instrument not having the anti-fraud device of the present invention, the receiving element 35 would be connected to points on the telephone instrument transmission network designated as terminals 264 and 266 in FIG. 3 via the wire pair 49. In order to prevent the introduction of a fraudulent grounding condition through the receiving element 35 of the wire pair 49, an isolation circuit shown within the dashed line box 256 is used to couple signals from the network to the receiving element without a physically continuous electrical path. The isolation circuit comprises a repeating transformer 262 also mounted internally to the telephone instrument to provide DC electrical isolation between the receiving element 35 and the network. It will be seen that the introduction of a fraudulent grounding condition at the receiving element 35 or the wire pair 49 of the handset cord cannot provide a ground reference potential at the transmission network terminals thereby preventing fraudulent calling through "pin fraud" introduced at the receiving element or handset cord.

The anti-fraud device embodied in the present invention operates to prevent both toll and local fraudulent calling. The anti-fraud device will further operate with all types of coin operated telephone instruments and will operate with any handset including handsets having electric element microphones for conversion of the acoustic voice signals into electric signals for transmission to the telephone network.

An anti-fraud device for use with a coin operated telephone instrument to prevent fraudulent local and toll calling has been described above in a preferred embodiment. It will be recognized that numerous changes and modifications may be made concerning the design and implementation of the invention without departing from the spirit and scope of the invention presented and accordingly, the invention has been described by way of illustration rather than limitation.

I claim:

1. Apparatus located internally within a telephone instrument housing for preventing fraudulent calling from a coin operated telephone instrument characterized by transmission network means for connecting the telephone instrument to a telephone subscriber line to send and receive electrical signals representative of audio and call supervision to and from the telephone line, the telephone instrument further including a transmitting element for converting audio signals into electrical signals, a receiving element for converting electrical signals into audio signals and a touch-tone dial keypad, wherein said fraudulent calling is initiated by the telephone user introducing a "tip-to-ground" fraud condition to defeat detection of a coin collect supervisory signal generated by associated coin collection telephone supervisory circuits located in a telephone office serving the coin operated telephone instrument, said apparatus comprising:

relay circuit means having first and second transfer contracts arranged in series with the transmitting element for electrically connecting and disconnecting the transmitting element to and from the telephone subscriber line;

means coupled to the telephone line for sensing an "ON-HOOK" and "OFF-HOOK" condition at the telephone instrument and for generating an electrical signal representative of said "ON-HOOK" and said "OFF-HOOK" condition;

timing pulse generating means responsive to said "ON-HOOK" - "OFF-HOOK" sensing means for producing a voltage pulse signal at predetermined timed intervals in response to the sensing of an "OFF-HOOK" condition;

means coupled to the touch-tone dial keypad for sensing the activation of any of the buttons associated with the keypad and used in dialing a telephone number;

first counting circuit means coupled to said dial keypad sensing means for counting the number of keypad activations after sensing an "OFF-HOOK" condition, said counter having an output and producing a voltage signed at its output after counting a predetermined number of keypad activations;

means coupled to the transmitting element for sensing the presence of an electrical ground potential between the transmitting element and the telephone instrument and for producing a voltage signal representative of the presence of the electrical ground potential at the transmitting element when said potential is present;

second counting circuit means coupled to said ground sensing means for counting the number of occurrences of the presence of electrical the ground potential, said second counting circuit means having a reset input for receiving a reset voltage signal to restart a count from zero, said reset input being coupled to said timing pulse generating means for receiving said predetermined timed interval voltage pulse signal, said second counting circuit means having an output and producing an output voltage signal in response to counting a predetermined number of grounding occurrences during the time interval between successive predetermined timed interval voltage pulse signals;

circuit logic means having an output and a plurality of inputs and arranged to produce an output voltage upon the presence of a voltage signal at any one of said plurality of inputs, a first of said inputs being coupled to said "ON-HOOK" - "OFF-HOOK" sensing means, a second of said inputs being coupled to the output of said first counting means, a third of said inputs being coupled to the output of said second counting circuit means;

first relay driving means coupled to the output of said circuit logic means and having an output coupled to said relay circuit means for causing said first relay driving means to produce an output voltage signal in response to the sensing of an "ON-HOOK" to "OFF-HOOK" condition of the telephone instrument to set said relay circuit means to operate said first and second transfer contacts to electrically connect the transmitting element to the telephone subscriber line, and second relay driving means coupled to the output of said circuit logic means and having an output coupled to said relay circuit means for causing said second relay driving means to produce an output voltage signal in response to the sensing of any one of a number of conditions including the sensing of an electrical ground potential between the transmitting element and the telephone instrument, the activation of said touch-tone dial keypad and the change from an "OFF-HOOK" to an "ON-HOOK" condition of the telephone instrument to reset said relay circuit means to operate said first and second transfer contacts to electrically disconnect the transmitting element from the telephone subscriber line.

2. Apparatus for preventing fraudulent calling as defined in claim 1 further comprising isolation circuit means for electrically coupling the receiving element to the telephone instrument transmission network whereby DC electrical isolation is provided between the receiving element and the telephone transmission network.

* * * * *